United States Patent
Satou et al.

(10) Patent No.: US 7,280,161 B2
(45) Date of Patent: Oct. 9, 2007

(54) NOISE REDUCTION CIRCUIT AND METHOD

(75) Inventors: Takayuki Satou, Minato-ku (JP); Hidetsugu Takahashi, Minato-ku (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 551 days.

(21) Appl. No.: 10/981,776

(22) Filed: Nov. 5, 2004

(65) Prior Publication Data

US 2005/0122433 A1    Jun. 9, 2005

(30) Foreign Application Priority Data

Dec. 9, 2003  (JP)  ............................. 2003-410159

(51) Int. Cl.
*H04N 5/00* (2006.01)
*H04N 5/14* (2006.01)
*H04N 9/64* (2006.01)
*G06K 9/40* (2006.01)

(52) U.S. Cl. .................. 348/701; 348/607; 348/624; 348/618; 348/620; 382/254; 382/264; 382/275

(58) Field of Classification Search ................ 348/607, 348/618–620, 624, 701; 382/254, 264, 270, 382/275
See application file for complete search history.

(56) References Cited

U.S. PATENT DOCUMENTS 5,969,777 A * 10/1999 Mawatari .............. 375/240.26
6,061,100 A * 5/2000 Ward et al. ................. 348/607
6,094,231 A * 7/2000 Wischer-Mann ............ 348/607
6,307,888 B1 * 10/2001 Le Clerc ............... 375/240.29
6,667,776 B1 * 12/2003 Sumiyoshi et al. ......... 348/669
6,847,408 B1 * 1/2005 Webb ........................ 348/607
7,064,793 B2 * 6/2006 Hahn et al. ................. 348/619
7,098,958 B2 * 8/2006 Wredenhagen et al. ..... 348/452
7,170,562 B2 * 1/2007 Yoo et al. ................... 348/452
7,199,838 B2 * 4/2007 Lin et al. .................... 348/607
2002/0080281 A1 * 6/2002 Yoshiyama et al. ......... 348/623
2005/0128356 A1 * 6/2005 Babonneau et al. ........ 348/607

FOREIGN PATENT DOCUMENTS

JP    2002-223374 A    8/2002

\* cited by examiner

*Primary Examiner*—Brian P. Yenke
(74) *Attorney, Agent, or Firm*—Volentine & Whitt, PLLC (57) ABSTRACT

A noise reduction circuit and method effectively reduce noise with a simple structure regardless of the partial content of an image while suppressing an increase in the capacity of the image memory used and process delays. The present invention forms noise-reduced data by utilizing a correlation between from the difference between a pixel subjected to noise reduction and data of a pixel that is shifted by a predetermined amount in a time direction and/or spatial direction, and forms a difference cause discriminating signal indicating whether the difference is due to a valid change of the image. The noise-reduced data and the difference cause discriminating signal are formed for a plurality of different correlations. Final noise-reduced video data are obtained by selecting a method for determining the final noise-reduced video data based on the difference cause discriminating signals, and accordingly selecting/combining the plurality of noise-reduced data.

20 Claims, 8 Drawing Sheets

|  | Time Difference | Vertical Difference |
|---|---|---|
| Frame-Delay Data | 2V Time Difference: Yes | 0H Vert. Difference: No |
| Field-Delay Data | 1V Time Difference: Yes (smaller than for frames) | 0.5H Vert. Difference: Yes (smaller than for lines) |
| Line-Delay Data | 0V Time Difference: No | 1H Vert. Difference: Yes |

Fig. 3

| | Inter-Frame Movement: No | Inter-Frame Movement: Yes | | | |
|---|---|---|---|---|---|
| | | Inter-Field Movement/Edge: No | Inter-Field Movement/Edge: Yes | | |
| | | | Inter-Line Edge: No | Inter-Line Edge: Yes | |
| Inter-Frame Noise-Reduced Data | Correlation: Yes Effect of Noise Reduction: Large | Correlation: No Afterimage Generated in Time Direction | Correlation: No Afterimage Generated in Time Direction | Correlation: No Afterimage Generated in Time Direction | |
| Inter-Field Noise-Reduced Data | Effect of Inter-Frame Noise-Reduced Data Larger; Therefore Not Selected | Correlation: Yes Effect of Noise Reduction: Large | Correlation: No Afterimage Generated in Time/V Direction | Correlation: No Afterimage Generated in Time/V Direction | |
| Inter-Line Noise-Reduced Data | Effect of Inter-Frame Noise-Reduced Data Larger; Therefore Not Selected | Effect of Inter-Field Noise-Reduced Data Larger; Therefore Not Selected | Correlation: Yes Effect of Noise Reduction: Large | Correlation: No Afterimage Generated in V Direction | |
| Combined Noise-Reduced Data | Effect of Inter-Frame Noise-Reduced Data Larger; Therefore Not Selected | Effect of Inter-Field Noise-Reduced Data Larger; Therefore Not Selected | Effect of Inter-Line Noise-Reduced Data Larger; Therefore Not Selected | Correlation: No Effect of Noise Reduction: Medium Some Afterimages | |

| | Inter-Frame Movement: No | Inter-Frame Movement: Yes | |
|---|---|---|---|
| | | Inter-Field Movement/Edge: No | Inter-Field Movement/Edge: Yes | |
| | | | Inter-Line Edge: No | Inter-Line Edge: Yes |
| Inter-Frame Noise-Reduced Data | Correlation: Yes Effect of Noise Reduction: Large | Correlation: No Afterimage Generated in Time Direction | Correlation: No Afterimage Generated in Time Direction | Correlation: No Afterimage Generated in Time Direction |
| Inter-Field Noise-Reduced Data | Effect of Inter-Frame Noise-Reduced Data Larger; Therefore Not Selected | Correlation: Yes Effect of Noise Reduction: Large | Correlation: No Afterimage Generated in Time/V Direction | Correlation: No Afterimage Generated in Time/V Direction |
| Inter-Line Noise-Reduced Data | Effect of Inter-Frame Noise-Reduced Data Larger; Therefore Not Selected | Effect of Inter-Field Noise-Reduced Data Larger; Therefore Not Selected | Correlation: Yes Effect of Noise Reduction: Large | Correlation: No Afterimage Generated in V Direction |
| Low-Pass Filtered Noise-Reduced Data | Effect of Inter-Frame Noise-Reduced Data Larger; Therefore Not Selected | Effect of Inter-Field Noise-Reduced Data Larger; Therefore Not Selected | Effect of Inter-Line Noise-Reduced Data Larger; Therefore Not Selected | Correlation: Irrelevant Effect of Noise Reduction: Medium No Afterimages |

NOISE REDUCTION CIRCUIT AND METHOD

BACKGROUND OF THE INVENTION

1. Field of the Invention

The present invention generally relates to a noise reduction circuit and method. More specifically, the present invention relates to a noise reduction circuit and method that can be applied to a video display apparatus or a video recording/reproducing apparatus, for example.

2. Background Information

A conventional method to reduce noise in video data is disclosed in JP 2002-223374A. JP 2002-223374A discloses a noise reduction method, in which pixels of the same position in an image in a plurality of frames of an input video signal are extracted, noise is determined based on a signal change of the pixels between the frames, and a reduction procedure is performed. However, when using only a noise reduction process that is based only on the signal change between frames, as in the above-described conventional method, the time difference at which the signal change is obtained is large. Further, it is not possible to reduce noise effectively without using a complex circuit for moving parts.

Moreover, in the above-described conventional method, another problem was that the effect of the noise reduction for static parts is large and memory capacity is enlarged because it requires a plurality of memories of the size of one frame or a memory with the capacity of at least two frames.

Furthermore, yet another problem in the above-described conventional method was that a time difference between an audio signal and a video signal is generated because a delay of at least one frame arises in the noise reduction process and additional and considerable memory capacity and complex circuits are needed in correcting the delay.

Therefore, a noise reduction circuit and method that effectively reduce the noise with a simple structure regardless of the partial content of the image while suppressing process delay as well the capacity of the image memory used are desired.

In view of the above, it will be apparent to those skilled in the art from this disclosure that there exists a need for an improved a noise reduction circuit and method. This invention addresses this need in the art as well as other needs, which will become apparent to those skilled in the art from this disclosure.

SUMMARY OF THE INVENTION

In order to solve the aforementioned problems, a noise reduction circuit according to a first aspect of the present invention includes a video data storage device, a plurality of correlation-utilizing noise reduction devices, a selecting/combining control signal production device, and a selecting/combining device. The video data storage device stores noise-reduced video data of a directly preceding predetermined period. Each of the correlation-utilizing noise reduction devices forms and outputs noise-reduced data by utilizing a correlation based on a difference between two sets of data. The two sets of data are data of a pixel of the input video data that are subjected to noise reduction, and data received from the video data storage device of a pixel that is shifted by a predetermined amount in a time direction and/or spatial direction with respect to the pixel that is subjected to noise reduction. Each of the correlation-utilizing noise reduction devices forms and outputs a difference cause discriminating signal indicating whether the difference is due to noise or whether the difference is due to a valid change of the image. The difference cause discriminating signal is formed based on a temporal change of the difference. Further, the plurality of correlation-utilizing noise reduction devices has different combinations of shift amounts in the time direction and/or the space direction. The selecting/combining control signal production device forms and outputs a selecting/combining control signal representing a method to determine final noise-reduced video data based on the difference cause discriminating signals from each of the correlation-utilizing noise reduction devices. The selecting/combining device obtains the final noise-reduced video data by selecting or combining the noise-reduced data from the plurality of correlation-utilizing noise reduction devices based on the selecting/combining control signal.

A noise reduction method according to a second aspect of the present invention includes a video data storage step, a plurality of correlation-utilizing noise reduction steps, a selecting/combining control signal production step, and a selecting/combining step. The video data storage step is provided to store noise-reduced video data of a directly preceding predetermined period. Each of the correlation-utilizing noise reduction steps is provided to form and to output noise-reduced data by utilizing a correlation based on a difference between two sets of data. The two sets of data are data of a pixel of the input video data that is subjected to noise reduction, and data produced by the video data storage step of a pixel that is shifted by a predetermined amount in a time direction and/or spatial direction with respect to the pixel that is subjected to noise reduction. Each of the correlation-utilizing noise reduction steps forms and outputs a difference to cause a discriminating signal that indicates whether the difference is due to noise or whether the difference is due to a valid change of the image. The difference causes the discriminating signal to be formed based on a temporal change of the difference. Further, the plurality of correlation-utilizing noise reduction steps has different combinations of shift amounts in the time direction and/or the space direction. The selecting/combining control signal production step forms and outputs a selecting/combining control signal that represents a method for determining final noise-reduced video data based on the difference cause discriminating signals from the plurality of correlation-utilizing noise reduction steps. The selecting/combining step obtains the final noise-reduced video data by selecting or combining the noise-reduced data from the plurality of correlation-utilizing noise reduction steps, based on the selecting/combining control signal.

According the noise reduction circuit and method of the present invention, it is possible to reduce memory capacity because the plurality of correlation-utilizing noise reduction devices or steps uses a common video data storage device. It is also possible to suppress process delays to about the maximum time shift utilized for correlation. It is further possible to reduce noise effectively with a simple structure regardless of the partial content of the image because the final output data are obtained by selecting and/or combining the output data of the plurality of correlation-utilizing noise reduction devices or steps.

These and other objects, features, aspects, and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

(A) First Embodiment

Below, a noise reduction circuit and method according to a first preferred embodiment of the present invention is explained with reference to the drawings.

A video signal (video data) that is processed by the noise reduction circuit of the first embodiment can be a composite video signal or a component signal such as a luminance signal, a color signal, or a color-difference signal. The signal is preferably an interlaced signal and the number of lines per frame does not matter. Furthermore, data that are input into the noise reduction circuit of the first embodiment are entered as a digital signal (video data), but the bit number of the pixel data does not matter. The sampling frequency of the digital signal also does not matter. Moreover, the noise reduction circuit of the first embodiment can be included in an apparatus that processes video signals (video data) that are reproduced from a recording medium, an apparatus that processes video signals (video data) that are received from a network, an apparatus that processes broadcast video signals (video data), or an apparatus that processes video signals (video data) taken with a video camera.

(A-1) Configuration of the First Embodiment

Figure 1:
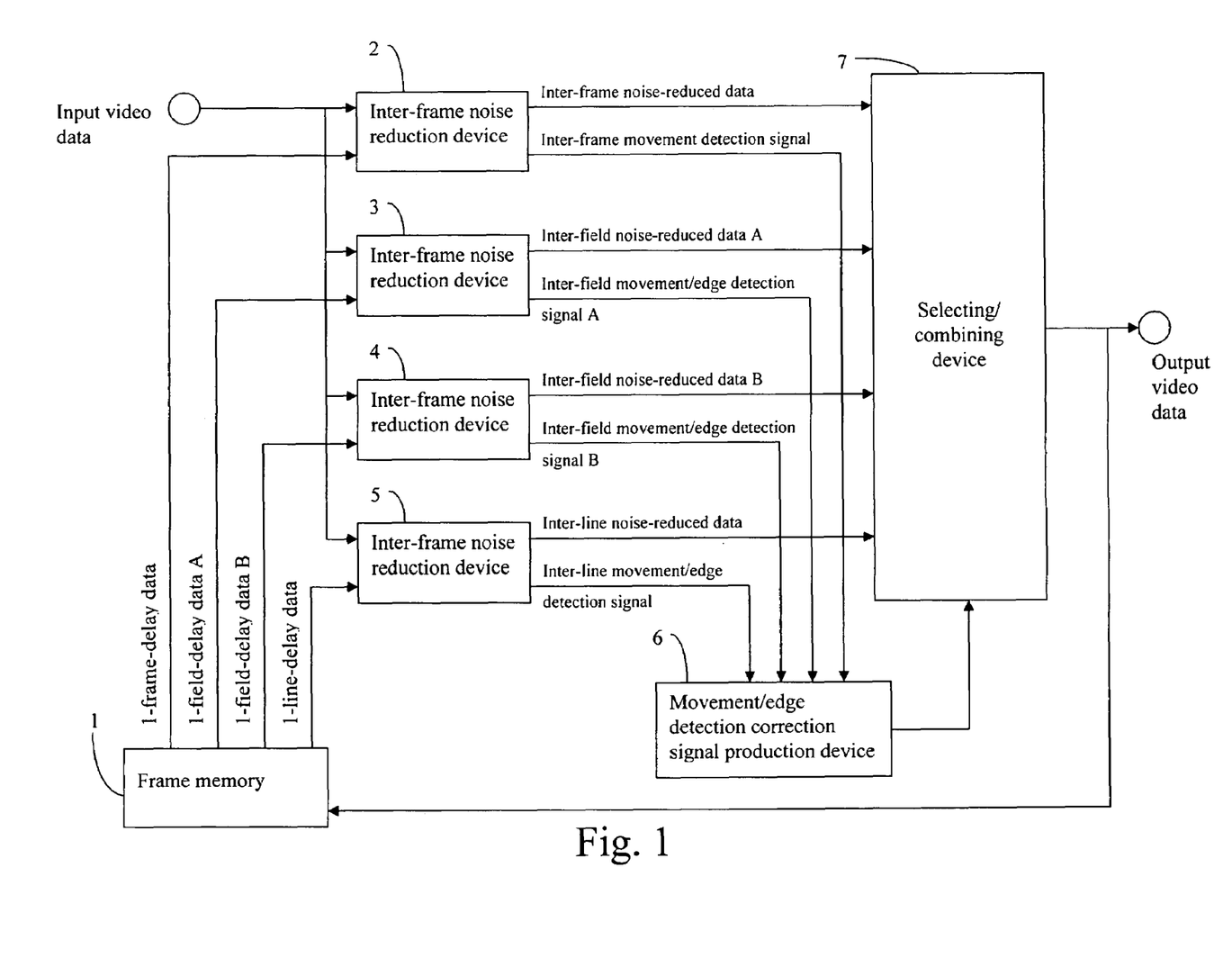
FIG. 1 is a view of a block diagram showing a configuration of a noise reduction circuit according to a first preferred embodiment of the present invention.

FIG. 1 is a view of a block diagram showing the configuration of the noise reduction circuit of the first embodiment. The noise reduction circuit of the first embodiment includes a frame memory 1 (video data storage device), an inter-frame noise reduction device 2, two inter-field noise reduction devices 3 and 4, an inter-line noise reduction device 5, a movement/edge detection correction signal production device 6, and a selecting/combining device 7. Below, the inter-field noise reduction device 3 is referred to as "the first inter-field noise reduction device," and the inter-field noise reduction device 4 is referred to as "the second inter-field noise reduction device."

The frame memory 1 stores at least one frame worth of noise-reduced video data that were output from the selecting/combining device 7. The frame memory 1 outputs the pixel data of the previous frame that are presently subjected to noise reduction (video image data) to the inter-frame noise reduction device 2, respectively outputs the data of two pixels of the previous field to the first inter-field noise reduction device 3 and the second inter-field noise reduction device 4, and outputs the pixel data of the previous line (1 horizontal scanning line) to the inter-line noise reduction device 5.

Figure 2:
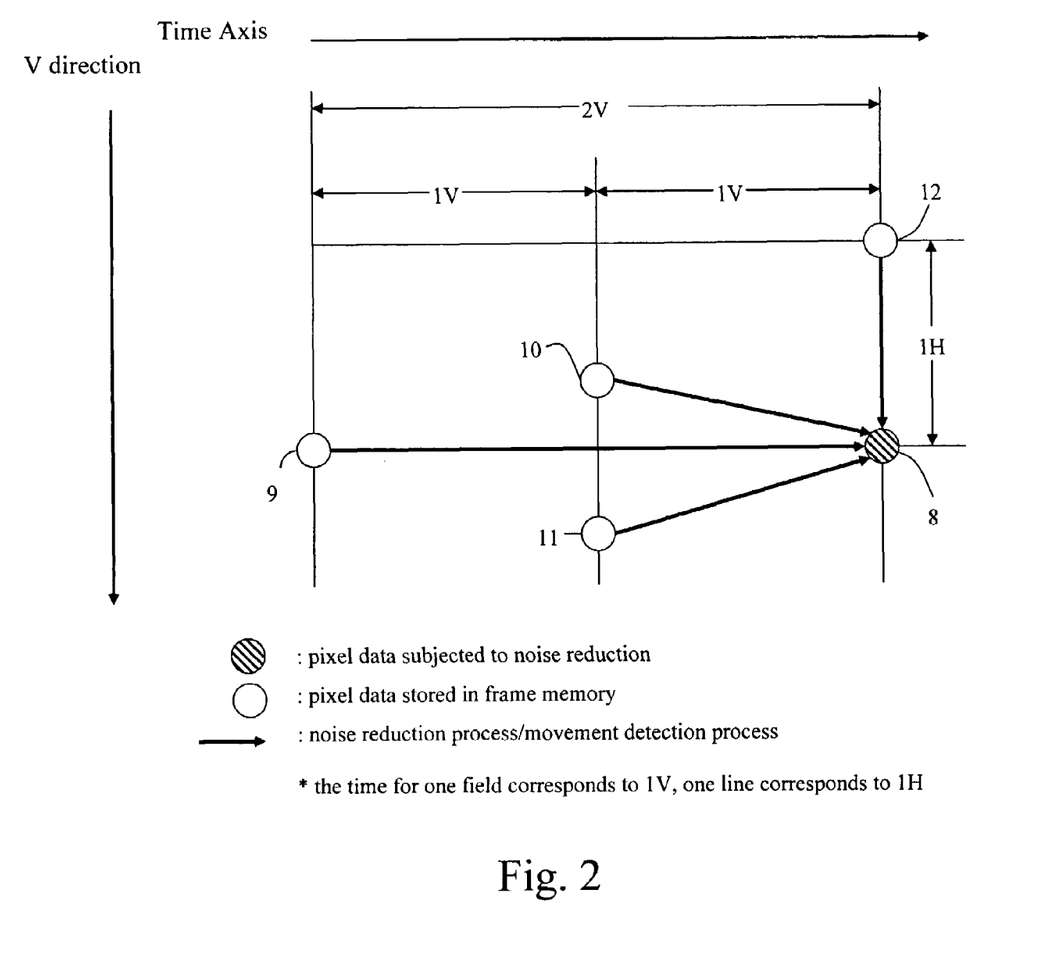
FIG. 2 is a view of a diagram showing a relation along a time axis direction and a vertical direction of past pixel data that are utilized to reduce noise and pixel data that are subjected to the noise reduction of the noise reduction circuit.

FIG. 2 is a view of a diagram showing a relation between pixel data that are subjected to noise reduction and previous pixel data that are used in reducing noise, plotted along a time axis direction and a Vertical direction (V direction). Pixel data 9 are the pixel data of one frame before (that is, two fields (field periods) before; 2V before) pixel data 8 that are subjected to the noise reduction and are output to the inter-frame noise reduction device 2. With regard to the vertical direction and the horizontal direction, the pixel data 9 of the previous frame are in the same position on a display as the pixel data 8 that are subjected to the noise reduction. Pixel data 10 and 111 are the pixel data of one field (period) (1V) before the pixel data 8 that are subjected to the noise reduction and are output to the first inter-field noise reduction device 3 and the second inter-field noise reduction device 4. The pixel data 10 that are output to the first inter-field noise reduction device 3 are located in the same position on a display with regard to the horizontal direction as the pixel data 8 that are subjected to the noise reduction (although it may be shifted by up to ½ pixel pitch). However, the pixel data 10 are located ½ line higher in the vertical direction. The pixel data 11 that are output to the second inter-field noise reduction device 4 are located in the same position on a display with regard to the horizontal direction as the pixel data 8 that are subjected to the noise reduction (although they may be shifted by up to ½ pixel pitch), but the pixel data 11 are located ½ line lower in the vertical direction. Pixel data 12 are the pixel data of the one line before (one horizontal scanning period; 1H) the pixel data 8 that are subjected to the noise reduction and are output to the inter-line noise reduction device 5. The pixel data 12 are located in the same position on a display in the horizontal direction as the pixel data 8 that are subjected to the noise reduction, but are located one line above the pixel data 8 in the vertical direction.

Referring to FIGS. 1 and 2, the inter-frame noise reduction device 2 forms inter-frame noise-reduced data and an inter-frame movement detection signal from the input video data and the 1-frame-delay data from the frame memory 1 (the formation will be explained in the section discussing the operation of the noise reduction circuit). Further, the inter-frame noise reduction device 2 outputs the inter-frame noise-reduced data to the selecting/combining device 7 and the inter-frame movement detection signal to the movement/edge detection correction signal production device 6.

The first inter-field noise reduction device 3 forms inter-field noise-reduced data A and an inter-field movement/edge detection signal A from the input video data and 1-field-delay data A from the frame memory 1 (see pixel data 10 in FIG. 2) (the formation will be explained in the section discussing the operation of the noise reduction circuit). Further, the first inter-field noise reduction device 3 outputs the inter-field noise-reduced data A to the selecting/combining device 7 and the inter-field movement/edge detection signal A to the movement/edge detection correction signal production device 6.

The second inter-field noise reduction device 4 forms inter-field noise-reduced data B and an inter-field movement/edge detection signal B from the input video data and 1-field-delay data B from the frame memory 1 (see pixel data 11 in FIG. 2) (the formation will be explained in the section discussing the operation of the noise reduction circuit). Further, the second inter-field noise reduction device 4 outputs the inter-field noise-reduced data B to the selecting/combining device 7 and the inter-field movement/edge detection signal B to the movement/edge detection correction signal production device 6.

The inter-line noise reduction device 5 forms inter-line noise-reduced data and an inter-line edge detection signal from the input video data and 1-line-delay data from the frame memory 1 (the formation will be explained in the section discussing the operation of the noise reduction circuit). Further, the inter-line noise reduction device 5 outputs the inter-line noise-reduced data to the selecting/combining device 7 and the inter-line edge detection signal to the movement/edge detection correction signal production device.

The movement/edge detection correction signal production device 6 forms a movement/edge detection correction signal from the inter-frame movement detection signal, the inter-field movement/edge detection signal A, the inter-field movement/edge detection signal B, and the inter-line edge detection signal. Further, the movement/edge detection correction signal production device 6 outputs the movement/edge detection correction signal as a control signal to the selecting/combining device 7.

The selecting/combining device 7 selects and/or combines the inter-frame noise-reduced data, the inter-field noise-reduced data A, the inter-field noise-reduced data B, and the inter-line noise-reduced data from the four noise reduction devices 2, 3, 4, and 5, in accordance with the movement/edge detection correction signal from the movement/edge detection correction signal production device 6. Further, the selecting/combining device 7 outputs the selected/combined data as the noise-reduced video data. The noise-reduced video data are output to the next stage and also given to the frame memory 1.

(A-2) Operation of the First Embodiment

Next, the operation of the noise reduction circuit and noise reduction method of the first embodiment of the present invention having the above-described configuration is explained.

In the noise reduction circuit of the first embodiment, when a new pixel of the input video data becomes the pixel that is subjected to the noise reduction (see numeral 8 in FIG. 2), the noise reduction devices 2 to 5 respectively conduct the following processes of forming the noise-reduced data for the pixel that is subjected to the noise reduction.

The inter-frame noise reduction device 2 first determines the absolute value of the difference (or difference squared; the same is true below) between the input video data (pixel data) 8 of the pixel that is subjected to the noise reduction and the 1-frame-delay data 9 (the pixel data of the one frame before) that are output from the frame memory 1. The inter-frame noise reduction device 2 then compares the absolute difference value to a threshold value for noise/movement discrimination. The difference is determined to be due to noise if the absolute difference value is smaller than the threshold value, and the difference is determined to be due to a movement of an image portion if the absolute difference value is larger than the threshold value. As is widely known in the art, in a part where an image is frozen, pixel data for the same location of consecutive frames essentially have identical values (correlation is extremely high), and even if there is difference, that difference is small. On the other hand, in a part where the image moves, the pixel data for the same location of consecutive frames are different due to the effect of the movement most of the times and the difference is large. The inter-frame noise reduction device 2 takes advantage of this property of the image.

When the inter-frame noise reduction device 2 determines the difference to be due to noise, based on the absolute difference value, the inter-frame noise reduction device 2 outputs inter-frame noise-reduced data obtained by removing the noise component from the input video data (pixel data) 8. On the other hand, when the inter-frame noise reduction device 2 determines the difference to be due to a movement, based on the absolute difference, the inter-frame noise reduction device 2 outputs the input video data (pixel data) 8 as are as the inter-frame noise-reduced data. It should be noted that the noise component removed from the input video data (pixel data) 8 can be the difference itself as described above, the value of multiplying the difference by a weighting coefficient of predetermined value, or the weighted average of the differences for a plurality of the immediately preceding pixels which were determined to be due to noise.

Furthermore, when the inter-frame noise reduction device 2 determines the difference to be due to a movement, based on the absolute difference value, the inter-frame noise reduction device 2 obtains a difference amount level (smoothened value) by passing the absolute difference value through a low-pass filter. Further, the inter-frame noise reduction device 2 forms and outputs an inter-frame movement detection signal which includes a data difference amount that has been determined as the movement and a movement discriminating signal (movement yes/no) that is determined from the difference amount level and the sign of the difference. Even when a movement is determined from the absolute difference, the movement discriminating signal of the inter-frame movement detection signal is not simply set to "movement: yes", but the content of the movement discriminating signal ("movement: yes" or "movement: no") is determined in accordance with the change that includes the sign (plus or minus) of the difference amount level that has been passed through the low-pass filter. The noise is random but there is a certain tendency in the change of the video data of the same pixel in the case of a movement. The content of the movement discriminating signal that is included in the inter-frame movement detection signal is therefore determined based on the difference amount level that is obtained through the low-pass filter.

The first inter-field noise reduction device 3 first determines the absolute value of the difference between the input video data (pixel data) 8 of the pixel that is subjected to the noise reduction and the 1-field-delay data 10 that are output from the frame memory 1. The first inter-field noise reduction device 3 then compares the absolute difference value to a threshold value for discriminating between noise and movement/edges. The difference is determined to be due to noise if the absolute difference value is smaller than the threshold value and the difference is determined to be due to a movement of the image portion or an edge if the absolute difference value is equal to or larger than the threshold value. The technical idea of trying to distinguish between noise and movement by comparing the absolute difference value with the threshold value is the same as for the inter-frame noise reduction device 2. It should be noted that the two data points used by the first inter-field noise reduction device 3 to determine the absolute difference value, that is, the input video data (pixel data) 8 and the pixel of 1-field-delay data 10 that is output from the frame memory 1 have the same horizontal position on a display but are shifted by ½ line in the vertical direction. Consequently, also if there is an edge of a stationary object within this width of shift between the pixel positions in the image, then the absolute difference becomes large. Consequently, the reason why the absolute difference value becomes equal to or larger than the threshold value arises not only from movements but also from the presence of edges.

When the first inter-field noise reduction device 3 determines that the difference is due to noise based on the absolute difference value, then the first inter-field noise reduction device 3 outputs inter-field noise-reduced data A obtained by removing the noise component from the input video data (pixel data) 8. On the other hand, when the first inter-field noise reduction device 3 determines that the difference is due to a movement or an edge, based on the absolute difference value, then the first inter-field noise reduction device 3 outputs the input video data (pixel data) 8 as they are as the first inter-field noise-reduced data A. It should be noted that the noise component removed from the input video data (pixel data) 8 can be the difference itself as described above, the value of multiplying the difference by a weighting coefficient of predetermined value, or the weighted average of the differences for a plurality of the immediately preceding pixels which were determined to be due to noise.

Furthermore, when the first inter-field noise reduction device 3 determines the difference to be due to a movement or an edge, based on the absolute difference value, the absolute difference value is passed through the low-pass filter to obtain the difference amount level (smoothened value). Further, the first inter-field noise reduction device 3 forms and outputs an inter-field movement/edge detection signal which includes a data difference amount that has been determined as either a movement or an edge and a movement/edge discriminating signal (movement/edge: yes/no) that is determined from the difference amount level and the sign of the difference.

The second inter-field noise reduction device 4 conducts a similar process as the first inter-field noise reduction device 3, based on the input video data (pixel data) 8 of the pixel that is subjected to the noise reduction and the 1-field-delay data 11 that are output from the frame memory 1.

The inter-line noise reduction device 5 first determines the absolute value of the difference between the input video data (pixel data) 8 of the pixels that are subjected to the noise reduction and 1-line-delay data 12 that is output from the frame memory 1. The inter-line noise reduction device 5 then compares this absolute difference value to a threshold value for noise/edge discrimination. The difference is determined to be due to noise if the absolute difference value is smaller than the threshold value, and the difference is determined to be due to the edge of the image portion if the absolute difference value is equal to or larger than the threshold value. The technical idea of trying to distinguish between noise and edges by comparing the absolute difference value with the threshold value is the same as for the first inter-field noise reduction device 3 and the second inter-field noise reduction device 4. It should be noted that the two data points used by the inter-line noise reduction device 5 to determine the absolute difference value, that is, the input video data (pixel data) 8 and the pixel of the 1-line-delay data 12 that are output from the frame memory 1 belong to the same frame and the same field, so that they cannot be used to detect movement but only to detect an edge.

When the inter-line noise reduction device 5 determines the difference to be due to noise, based on the absolute difference value, the inter-line noise reduction device 5 outputs inter-line noise-reduced data obtained by removing the noise component from the input video data (pixel data) 8. On the other hand, when the inter-line noise reduction device 5 determines the difference to be due to an edge, based on the absolute difference value, the inter-line noise reduction device 5 outputs the input video data (pixel data) 8 as they are as the inter-line noise-reduced data. It should be noted that the noise component removed from the input video data (pixel data) 8 can be the difference itself as described above, the value of multiplying the difference by a weighting coefficient of predetermined value, or the weighted average of the differences for a plurality of the immediately preceding pixels which were determined to be due to noise.

Furthermore, when the inter-line noise reduction device 5 determines the difference to be due to an edge, based on the absolute difference value, the absolute difference value is passed through the low-pass filter to obtain the difference amount level (smoothened value), and the inter-line noise reduction device 5 forms and outputs an inter-line edge detection signal which includes the data difference amount that has been determined as an edge and an edge discriminating signal (edge yes/no) that is determined from the difference amount level and a sign of the difference.

Figure 3:
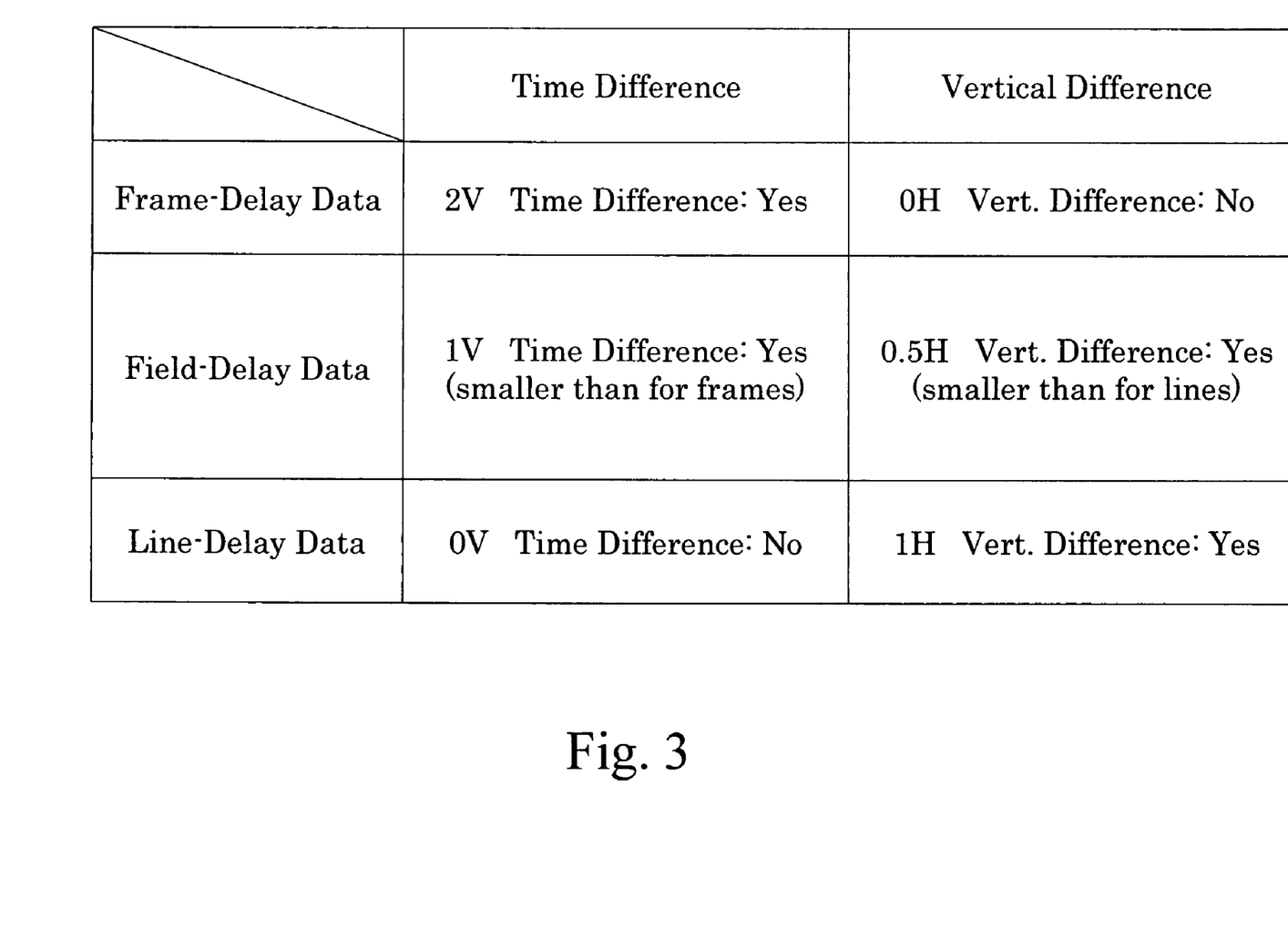
FIG. 3 is a view of a table listing the presence and the size of shifts in the time direction and the vertical direction between the two data points that are input into four different noise reduction devices of the noise reduction circuit.
Figure 4:
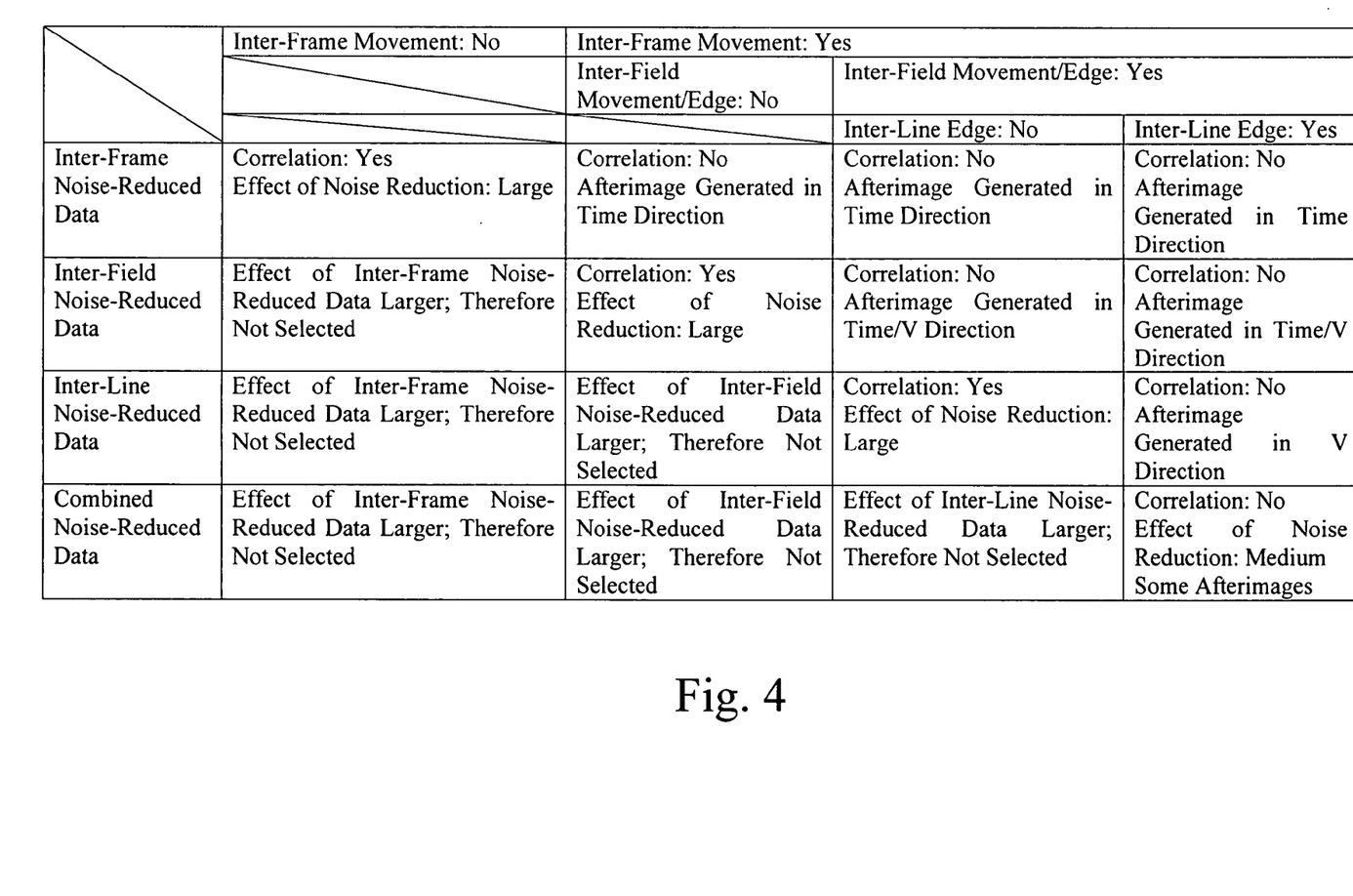
FIG. 4 is a view of a table illustrating the logic behind the selection or combination of noise-reduced data with a selecting/combining device of the noise reduction circuit.

FIG. 3 is a view of a table listing the presence and the size of shifts in the time direction and the vertical direction between the two data points that are input into the four different noise reduction devices 2 to 5. It should be noted that it is assumed in FIG. 3 that there is no shift in position in the horizontal direction. FIG. 4 is a view of a table that explains the meaning of the control signals from the movement/edge detection correction signal production device 6 to the selecting/combining device 7. In other words, FIG. 4 is a table that explains the logic behind the selection or combination with the selecting/combining device 7.

For the 1-frame-delay data 9 that are related to the inter-frame noise reduction device 2, the shift in the time axis direction with respect to the pixel data 8 that are subjected to the noise reduction is relatively large at 2V (V is one field period). However, since there is no shift in the position in the V direction (vertical direction), only when there is no movement between the frames, as shown in FIG. 4, it is possible to extract the noise component from the noise-reduced data by determining the absolute value of the difference between the 1-frame-delay data 9 and the pixel data 8 that are subjected to the noise reduction. However when there is a movement between the frames, a positional afterimage is generated if the difference data are used to generate the noise-reduced data, because it is not possible to correlate the data over time.

Moreover, for the 1-line-delay data 12 that are related to the inter-line noise reduction device 5, although there is no shift in the time axis direction, there is a one line shift in the V direction with respect to the pixel data 8 that are subjected to the noise reduction, as shown in FIG. 3. Consequently, as FIG. 4 shows, when there is no edge between the lines, it is possible to extract the noise component from the noise-reduced data by determining the absolute value of the difference between the 1-line-delay data 12 and the pixel data 8 that are subjected to the noise reduction. However, when there is an edge between the lines, a positional afterimage is generated if the difference data is used to generate the noise-reduced data, because it is not possible to correlate the data over the V direction.

Furthermore, in the 1-field-delay data A (10) and 1-field-delay data B (11) that are related to the first inter-field noise reduction device 3 or the second inter-field noise reduction device 4, there is a shift of 1V in the time axis direction, which corresponds to ½ the time of the shift between frames, and of 0.5H (H is one horizontal scanning period) in the V direction, which corresponds to ½ line of the shift between lines, with respect to the pixel data 8 that are subjected to the noise reduction, as shown in FIG. 3. Consequently, as FIG. 4 shows, when there is neither a movement nor edge in both the 1-field-delay data A (10) and 1-field-delay data B (11), the average data of the 1-field-delay data A (10) and the 1-field-delay data B (11) is generated. It is possible to extract the noise component from the noise-reduced data by determining the absolute value of the difference between the averaged data and the pixel data 8 that are subjected to the noise reduction. Furthermore, when there is no movement or edge in either the 1-field-delay data A (10) or 1-field-delay data B (11), it is possible to extract the noise component from the noise-reduced data by determining the absolute value of the difference between the data with no movement and the pixel data 8 that are subjected to the noise reduction. However, when there is a movement or an edge in both the 1-field-delay data A (10) or 1-field-delay data B (11), a temporal or positional afterimage is generated if the difference data are used to produce the noise-reduced data, because it is not possible to correlate the data over time and over the vertical direction.

The movement/edge detection correction signal production device 6 thus forms a control signal used to select or to combine the noise-reduced data in such a way that the afterimage both in the time and V directions is always minimized. The final noise-reduced video data are obtained as the selecting/combining device 7 selects or combines the noise-reduced data from the four noise reduction devices 2 to 5 according to the control signal.

Figure 5:
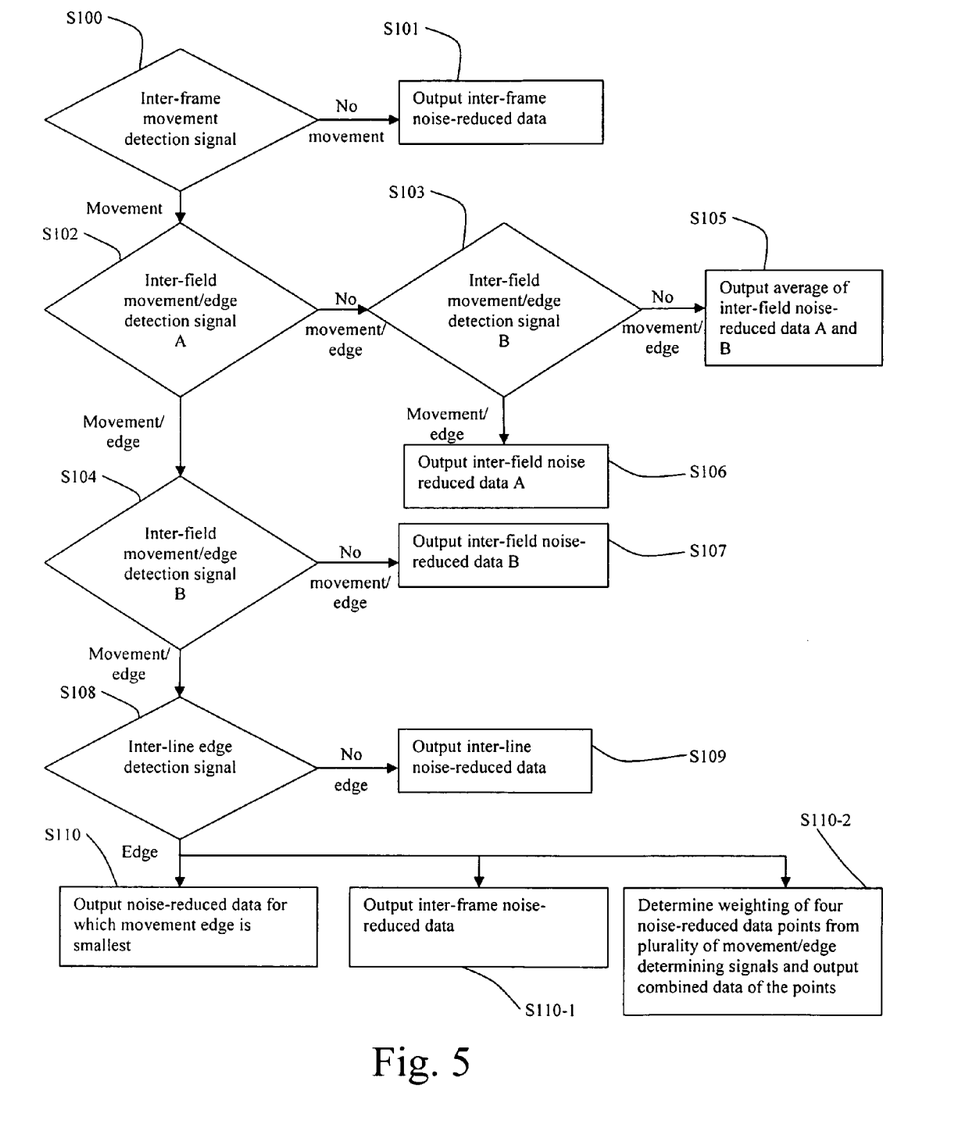
FIG. 5 is a view of a flowchart showing a process to form the selecting/combining control signal of a movement/edge detection correction signal production device of the noise reduction circuit.

FIG. 5 is a view of a flowchart showing a processing example of forming the control signal of the movement/edge detection correction production device 6.

The movement/edge detection correction production device 6 first distinguishes whether or not there is a movement in the inter-frame movement detection signal between two frames (S100). If there is no movement between the frames, the movement/edge detection correction signal production device 6 lets the selecting/combining device 7 select the inter-frame noise-reduced data as the output video data (S101).

On the other hand, if there is a movement between the frames, the movement/edge detection correction signal production device 6 distinguishes between combinations of the content of the inter-field movement/edge detection signal A and the inter-field movement/edge detection signal B (S102 to S104). If both the inter-field movement/edge detection signal A and the inter-field movement/edge detection signal B indicate that there is no movement, then the movement/edge detection correction signal production device 6 lets the selecting/combining device 7 output, as the output video data, inter-field noise-reduced data obtained by averaging the inter-field noise-reduced data A and the inter-field noise-reduced data B (S105). Moreover, if there is no movement in the inter-field movement/edge detection signal A but there is a movement in the inter-field movement/edge detection signal B, the movement/edge detection correction signal production device 6 lets the selecting/combining device 7 select the inter-field noise-reduced data A as the output video data (S106). Furthermore, if there is a movement in the inter-field movement/edge detection signal A but no movement in the inter-field movement/edge detection signal B, the movement/edge detection correction signal production device 6 lets the selecting/combining device 7 select the inter-field noise-reduced data B as the output video data (S107).

If both the inter-field movement/edge detection signal A and the inter-field movement/edge detection signal B indicate a movement or an edge, then the movement/edge detection correction signal production device 6 distinguishes the content of the inter-line edge detection signal (S108). If there is no edge, the movement/edge detection correction signal production device 6 lets the selecting/combining device 7 select the inter-line noise-reduced data as the output video data (S109). If there is an edge, the movement/edge detection correction signal production device 6 lets the selecting/combining device 7 select the noise-reduced data with the lowest difference amount level of the movement or the edge as the output video data (S110).

If the inter-line edge detection signal indicates that there is an edge, the movement/edge detection correction signal production device 6 also may let the selecting/combining device 7 select the inter-frame noise-reduced data (S110-1), or decide on a method of weighting the four noise-reduced data points from the four movement/edge discriminating signals and form the output video data by a weighted combination of the four noise-reduced data points (S110-2). In the latter case, noise-reduced data that correspond to the discriminating signals with smaller difference amount levels are given more weight.

(A-3) Effects of the First Embodiment

According to the first embodiment, it is possible to realize effective noise reduction that suppresses the afterimages that occur when the inter-frame, inter-field, and inter-line noise reduction are respectively, performed by combining noise reduction processes utilizing the four correlations such as inter-frame correlation, inter-field A correlation, inter-field B correlation, and inter-line correlation using one frame worth of memory. In other words, it is possible to reduce effectively the noise of any part of the image regardless of the content of the part by combining noise reduction processes that utilize the four correlations of inter-frame, inter-field A, inter-frame B, and inter-line noise reduction.

Here, although the input delay data that are correlated with the input video data are different, the noise reduction devices, which utilize the four correlations, may have the same internal structure and make it possible to realize the noise reduction circuit.

In addition, although a plurality of noise reduction methods are applied, a capacity of one frame is sufficient for the image memory and it is possible to make the memory capacity smaller than in conventional noise reduction methods. Furthermore, it is possible to shorten the process delay during the noise reduction process to such a short time as approximately one frame period. Especially in a device in which synchronization of the video signal and the audio signal becomes a problem, a short process delay from the noise reduction process is advantageous in that the structure used exclusively for the synchronization can be limited to a minimum.

As used herein, the following directional terms "forward, rearward, above, downward, vertical, horizontal, below, and transverse" as well as any other similar directional terms refer to those directions of a device equipped with the present invention. Accordingly, these terms, as utilized to describe the present invention should be interpreted relative to a device equipped with the present invention.

Alternate Embodiments

Alternate embodiments will now be explained. In view of the similarity between the first and alternate embodiments, the parts of the alternate embodiments that are identical to the parts of the first embodiment will be given the same reference numerals as the parts of the first embodiment. Moreover, the descriptions of the parts of the alternate embodiments that are identical to the parts of the first embodiment may be omitted for the sake of brevity.

(B) Second Embodiment

Figure 6:
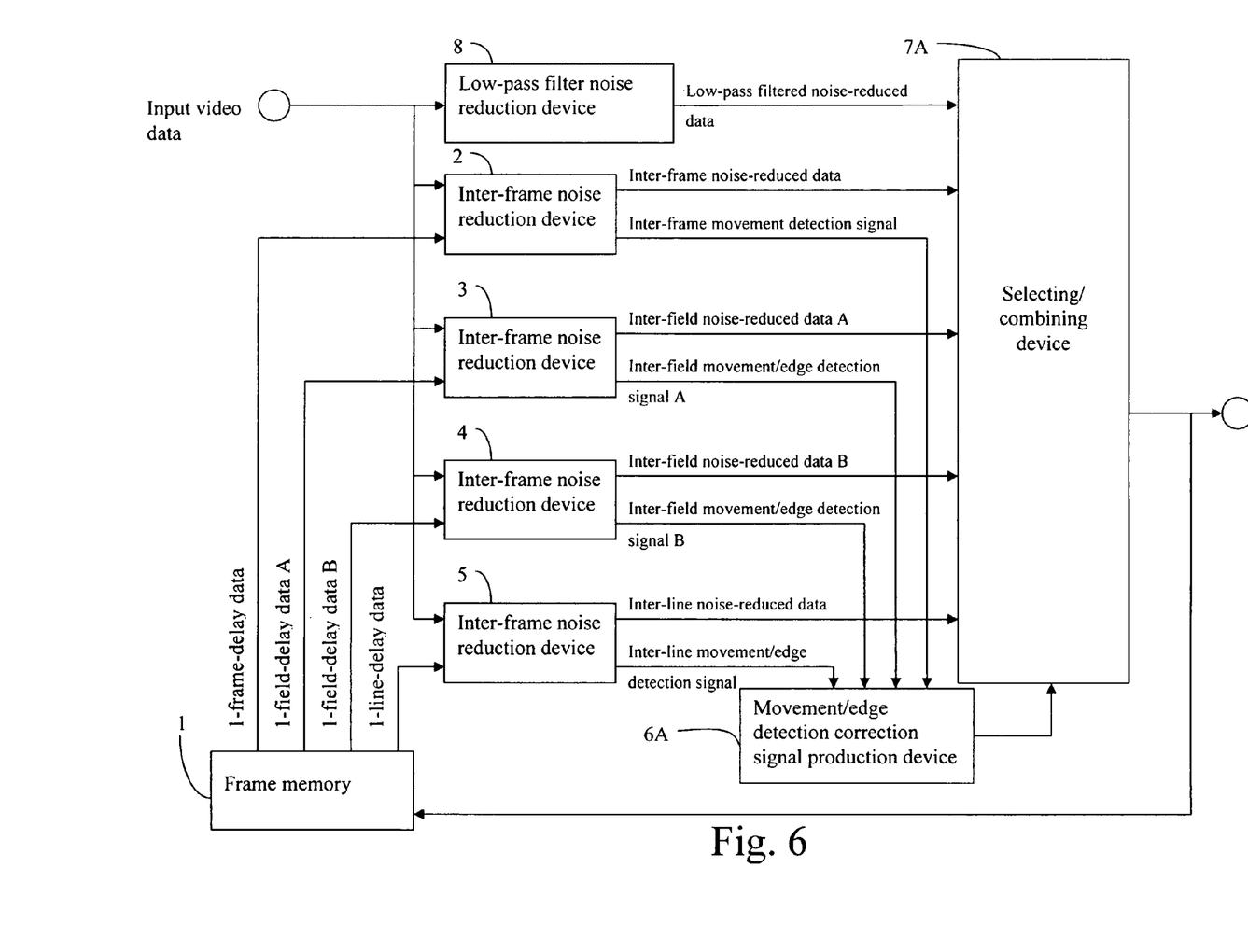
FIG. 6 is a view of a block diagram showing a configuration of a noise reduction circuit according to a second preferred embodiment of the present invention.

Next, a second embodiment of the noise reduction circuit and method according to the present invention is explained with reference to the drawings. FIG. 6 is a view of a block diagram showing a configuration of a noise reduction circuit of in accordance with a second preferred embodiment of the present invention. The same or corresponding symbols are used in FIG. 6 for parts that are the same or that correspond to the parts shown in FIG. 1 of the first embodiment. Since the structural elements with the same symbols are similar to or the same as those of the first embodiment, their further explanation is omitted.

As is evident from comparing FIG. 6 and FIG. 1, the noise reduction circuit of the second embodiment has a low-pass filter noise reduction device 8 serving as a noise reduction device in addition to the four noise reduction devices 2 to 5 utilizing the same or similar correlations as in the first embodiment.

The low-pass filter noise reduction device 8 performs noise reduction by passing the input video data through a low-pass filter to remove high-frequency noise components from the input video data. Processed data (low-pass filtered noise-reduced data) are output to a selecting/combining device 7A.

The selecting/combining device 7A is different from the selecting/combining device 7 of the first embodiment in that the low-pass filtered noise-reduced data from the low-pass filter noise reduction device 8 are also subjected to the selecting/combining process. Further, the movement/edge detection correction signal production device 6A is different from the movement/edge detection correction signal production device 6 of the first embodiment in that, under predetermined conditions, the movement/edge detection correction signal production device 6A also allows the selecting/combining device 7A to select or to combine the low-pass filtered noise-reduced data from the low-pass filter noise reduction device 8.

Figure 7:
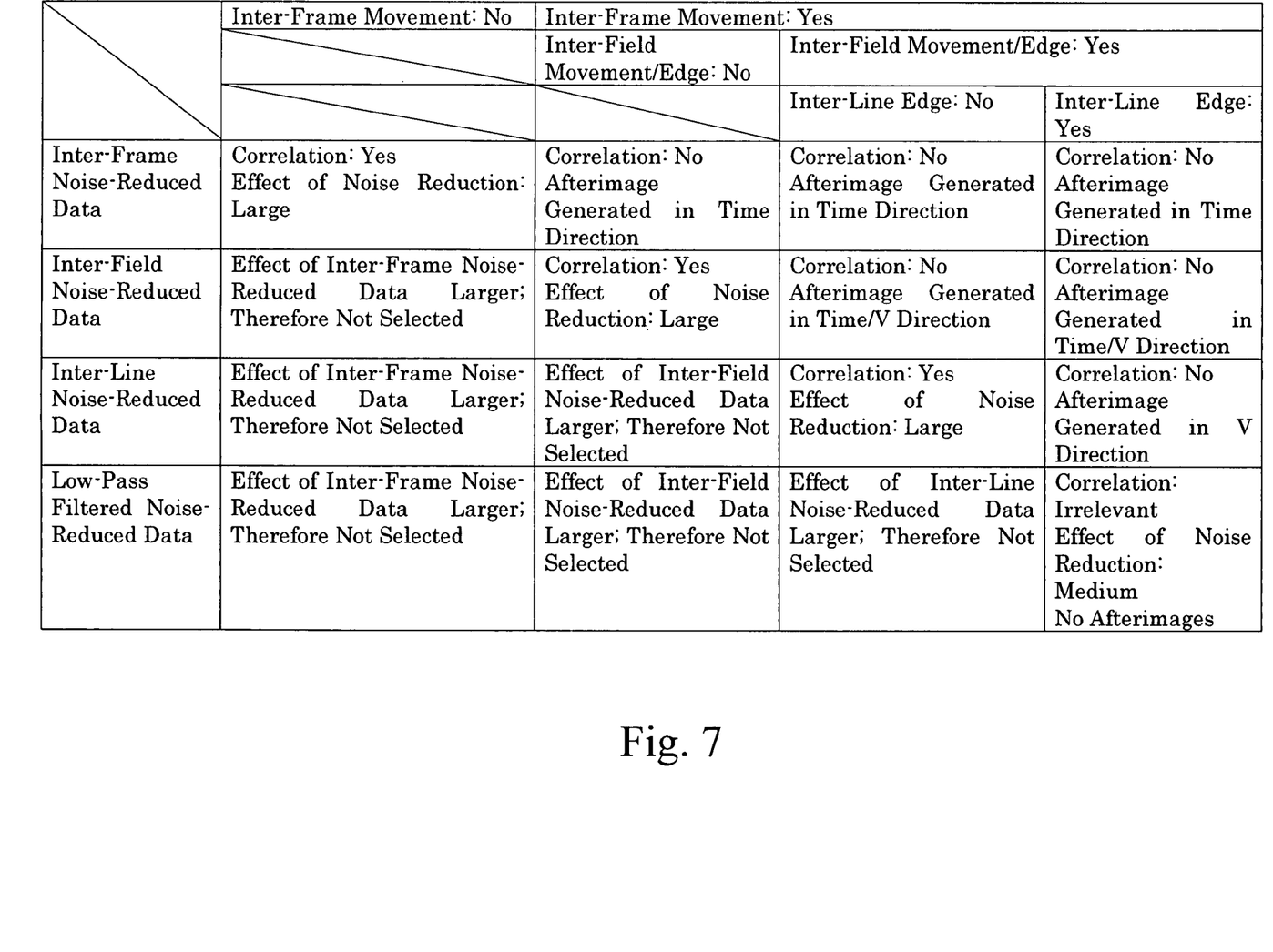
FIG. 7 is a view of a table illustrating the logic behind the selection or combination of the noise-reduced data of a selecting/combining device of the noise reduction circuit of FIG. 6.

FIG. 7 is a view of a table illustrating how the noise-reduced data of the second embodiment are selected. As FIG. 7 shows, the low-pass filtered noise-reduced data are selected when there is an inter-frame movement, an inter-field movement/edge, and an inter-line edge. Otherwise, the selecting/combining method of the noise-reduced data is the same as in the first embodiment.

Figure 8:
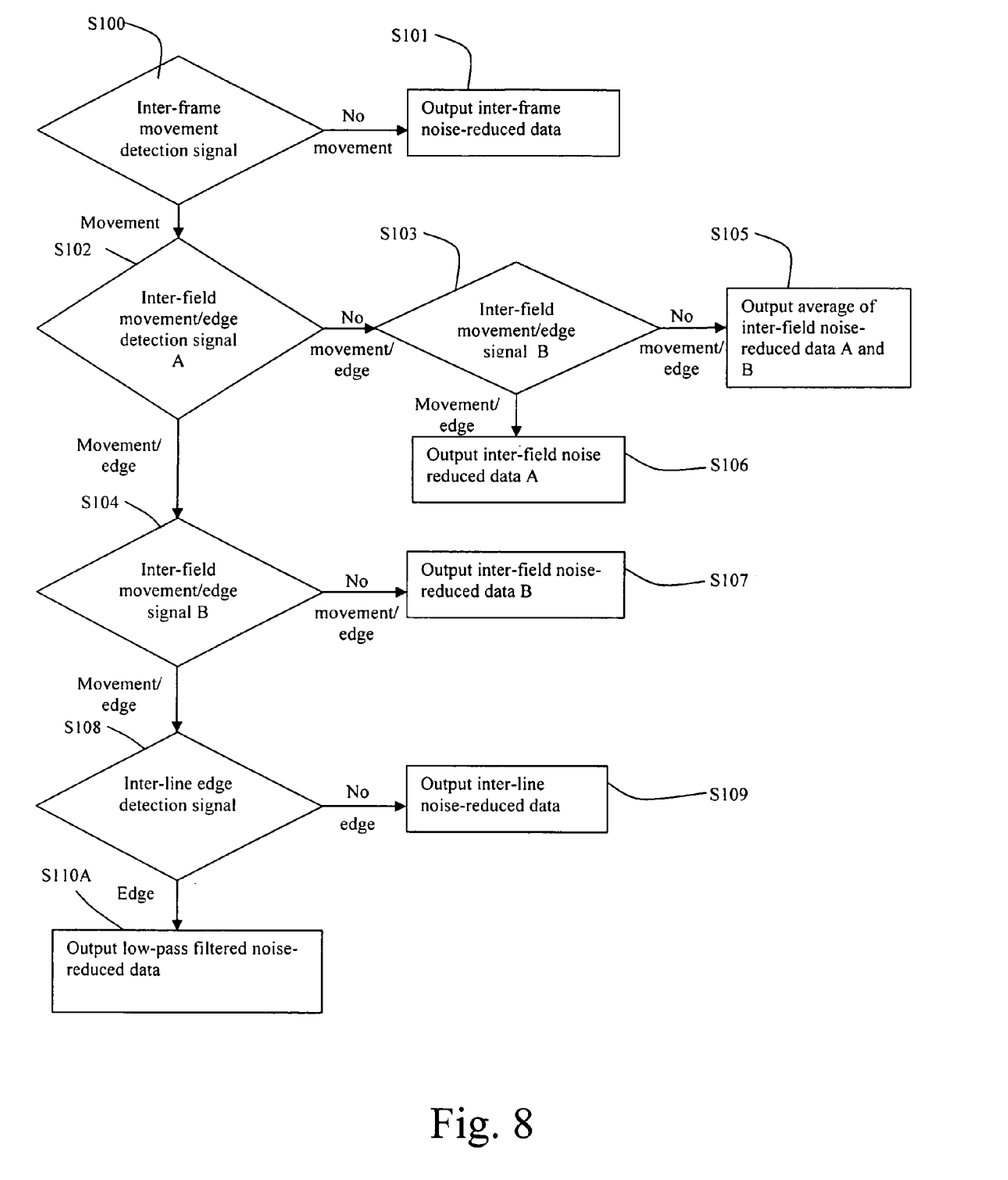
FIG. 8 is a view of a flowchart showing the process to form the selecting/combining control signal of a movement/edge detection correction signal production device of the noise reduction circuit of FIG. 6.

FIG. 8 is a flowchart showing an example of the process of forming a control signal of the movement/edge detection correction signal production device 6A of the second embodiment. The same or corresponding symbols are used for steps that are the same or correspond to the ones shown in FIG. 5 of the first embodiment.

The movement/edge detection correction signal production device 6A of the second embodiment also executes the steps S100 to S109 as necessary, just like or similar to the first embodiment. If the inter-line edge detection signal indicates that there is an edge, the movement/edge detection correction signal production device 6A of the second embodiment lets the selecting/combining device 7 output the low-pass filtered noise-reduced data as the output video data (S110A).

According to the second embodiment, it is possible to accomplish an effective noise reduction that suppresses the afterimages that occur when the inter-frame, inter-field, and inter-line noise reduction are respectively, performed by combining noise reduction processes utilizing the four correlations such as inter-frame correlation, inter-field A correlation, inter-field B correlation, and inter-line correlation, using one frame worth of memory, and the noise reduction process by the low-pass filter, in addition to the same effects of the first embodiment.

(C) Other Embodiments

In the first embodiment, four noise reduction devices are provided and in the second embodiment five noise reduction devices are provided, but the number of the noise reduction devices is not limited to the number in these embodiments.

For example, the noise reduction device also can be one that performs inter-frame and inter-field correlation, one that performs inter-frame and inter-line correlation, or one that performs inter-field and inter-line correlation. It may also be a noise reduction device that utilizes an inter-frame correlation of frames that are two or more frames apart. As an inter-field noise reduction device, it is also possible to provide only either one of the first inter-field noise reduction device and the second inter-field noise reduction device. Conversely, as an inter-line noise reduction device, it is also possible to provide both a first inter-line noise reduction device that utilizes the pixel data of the one line vertically above the pixel that is subjected to the noise reduction and a second inter-line noise reduction device that utilizes the pixel data of the one line vertically below the pixel that is subjected to the noise reduction. Furthermore, the low-pass filter noise reduction device can be added to the above-described combinations. However, it is preferable that noise reduction devices utilizing at least two kinds of correlation are provided.

It should be noted that if there are a plurality of types of noise reduction devices, the circuit can be designed so that the user can set the noise reduction devices to be utilized through DIP switches. For example, it is also possible to introduce to the first embodiment the technical idea that settings can be changed, and to deactivate the inter-line noise reduction device 5 or keep the movement/edge detection correction signal production device 6 from selecting the inter-line noise-reduced data from the inter-line noise reduction device 5 (omit S108 and S109 in FIG. 5) when the user decides not to use the inter-line noise reduction device 5.

In the foregoing embodiments, it is shown that the discriminating signal that indicates the presence of a movement or an edge is formed based on the difference amount level after the absolute difference value is passed through the low-pass filter, but it is also possible that the information which of the absolute difference value and the threshold value is larger is used as is to discriminate the presence of a movement or an edge. It should be noted that "presence of an edge or a movement" means the presence of a valid change of the image, which is not a change due to noise.

Furthermore, the embodiments above were explained for the cases in which the video signals are interlaced video signals, but the present invention can also be applied to non-interlaced video signals. For example, when the input signal is a video signal that has been changed from the interlaced format to the non-interlaced format, the concept of field exists. In addition, by incorporating an inter-frame and an inter-line noise reduction device, it is possible to handle non-interlaced video signals.

It should be noted that by using a video display apparatus of a television receiver or the like, it is possible to display easily the noise-reduced video. Using a video recording apparatus such as a video recorder (VTR, DVD, CD) or the like, it is possible to record easily the noise-reduced video. Using a video reproducing apparatus, it is possible to easily output the noise-reduced video.

The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention.

The terms of degree such as "substantially," "about," and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

This application claims priority to Japanese Patent Application No. 2003-410159. The entire disclosure of Japanese Patent Application No. 2003-410159 is hereby incorporated herein by reference.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A noise reduction circuit comprising:
   a video data storage means for storing noise-reduced video data of a directly preceding predetermined period;
   a plurality of correlation-utilizing noise reduction means each for forming and outputting noise-reduced data by utilizing a correlation based on a difference between two sets of data, said two sets of data being,
      data of a first pixel of input video data being subjected to noise reduction, and
      data received from said video data storage means of a second pixel being shifted by a predetermined amount in a time direction and/or space direction with respect to said first pixel,
   each of said plurality of correlation-utilizing noise reduction means for forming and outputting a difference cause discriminating signal indicating whether a difference is due to noise or a valid change of image, said difference cause discriminating signal being formed based on a temporal change of the difference, and said plurality of correlation-utilizing noise reduction means having different combinations of shift amounts in said time direction and/or said space direction;
   a selecting/combining control signal production means for forming and outputting a selecting/combining control signal for determining final noise-reduced video data based on said difference cause discriminating signals from said plurality of correlation-utilizing noise reduction means; and
   a selecting/combining means for obtaining said final noise-reduced video data by selecting or combining noise-reduced data from said plurality of correlation-utilizing noise reduction means, based on said selecting/combining control signal.

2. The noise reduction circuit according to claim 1 further comprising,
   a low-pass filter noise reduction means for outputting low-pass filtered noise-reduced data obtained by removing a high-frequency noise component from said input video data by passing said input video data through a low-pass filter,
   said selecting/combining control signal production means provides a selecting/combining control signal that selects said low-pass filtered noise-reduced data to said selecting/combining means depending on said selecting/combining control signal when said difference cause discriminating signals from all of said plurality of correlation-utilizing noise reduction means indicate that said differences occurs due to a valid change of said image.

3. The noise reduction circuit according to claim 2 wherein said video data storage means has a capacity allowing a shift amount in said time direction of said correlation-utilizing noise reduction means that utilizes a correlation between said first pixel and said second pixel, and said video data storage means supplies to each of said plurality of correlation-utilizing noise reduction means data for a third pixel in a position in said time direction and said space direction that corresponds to said first and second pixels.

4. The noise reduction circuit according to claim 3 wherein said plurality of correlation-utilizing noise reduction means includes a noise reduction means utilizing inter-frame correlation, a noise reduction means utilizing inter-field correlation, and a noise reduction means utilizing inter-line correlation.

5. The noise reduction circuit according to claim 2 wherein said plurality of correlation-utilizing noise reduction means includes a noise reduction means utilizing inter-frame correlation, a noise reduction means utilizing inter-field correlation, and a noise reduction means utilizing inter-line correlation.

6. The noise reduction circuit according to claim 1 wherein said video data storage means has a capacity allowing a shift amount in said time direction of said correlation-utilizing noise reduction means that utilizes a correlation between said first pixel and said second pixel, and said video data storage means supplies to each of said plurality of correlation-utilizing noise reduction means data for a third pixel in a position in said time direction and said space direction that corresponds to said first and second pixels.

7. The noise reduction circuit according to claim 6 wherein said plurality of correlation-utilizing noise reduction means includes a noise reduction means utilizing inter-frame correlation, a noise reduction means utilizing inter-field correlation, and a noise reduction means utilizing inter-line correlation.

8. The noise reduction circuit according to claim 1 wherein said plurality of correlation-utilizing noise reduction means includes a noise reduction means utilizing inter-frame correlation, a noise reduction means utilizing inter-field correlation, and a noise reduction means utilizing inter-line correlation.

9. A noise reduction method comprising:
  storing noise-reduced video data of a directly preceding predetermined period in a video data storage;
  reducing noise having different combinations of shift amounts in a time direction and/or space direction by utilizing a correlation based on a difference between two sets of data to form and to output noise-reduced data, said two sets of data being data of a first pixel of input video data being subjected to noise reduction and data received from said video data storage of a second pixel being shifted by a predetermined amount in said time direction and/or space direction with respect to first pixel;
  forming and outputting a difference cause discriminating signal indicating whether said difference is due to noise or a valid change of image, said difference cause discriminating signal being formed based on a temporal change of said difference;
  forming and outputting a selecting/combining control signal to determine final noise-reduced video data based on said difference cause discriminating signals; and
  obtaining said final noise-reduced video data by selecting or combining said noise-reduced data based on said selecting/combining control signal.

10. The noise reduction method according to claim 9 further comprising,
  outputting low-pass filtered noise-reduced data obtained by removing a high-frequency noise component from said input video data by passing said input video data through a low-pass filter when said selecting/combining control signal indicates that said difference occurs due to a valid change of the image.

11. The noise reduction method according to claim 10 wherein said video data storage has a capacity allowing a shift amount in said time direction when utilizing said correlation between said first pixel and said second pixel, and said video data storage supplies data for a position of a third pixel in said time direction and/or said space direction that corresponds to said noise reduced data.

12. The noise reduction method according to claim 11 wherein reducing noise includes, utilizing inter-frame correlation, utilizing inter-field correlation, and utilizing inter-line correlation.

13. The noise reduction method according to claim 10 wherein reducing noise includes, utilizing inter-frame correlation, utilizing inter-field correlation, and a utilizing inter-line correlation.

14. The noise reduction method according to claim 9 wherein said video data storage has a capacity allowing a shift amount in said time direction when utilizing said correlation between said first pixel and said second pixel, and said video data storage supplies data for a position of a third pixel in said time direction and/or said space direction that corresponds to said noise reduced data.

15. The noise reduction method according to claim 14 wherein reducing noise includes, utilizing inter-frame correlation, utilizing inter-field correlation, and utilizing inter-line correlation.

16. The noise reduction method according to claim 9 wherein reducing noise includes, utilizing inter-frame correlation, utilizing inter-field correlation, and utilizing inter-line correlation.

17. A noise reduction circuit comprising:
  a video data storage device being configured to store noise-reduced video data of a directly preceding predetermined period;
  a plurality of correlation-utilizing noise reduction devices each being configured to form and to output noise-reduced data by utilizing a correlation based on a difference between two sets of data, said two sets of data being,
    data of a first pixel of input video data being subjected to noise reduction, and
    data received from said video data storage device of a second pixel being shifted by a predetermined amount in a time direction and/or space direction with respect to said first pixel,
  each of said plurality of correlation-utilizing noise reduction devices being configured to form and to output a difference cause discriminating signal indicating whether a difference is due to noise or a valid change of image, said difference cause discriminating signal being formed based on a temporal change of the difference, and said plurality of correlation-utilizing noise reduction devices having different combinations of shift amounts in said time direction and/or said space direction;
  a selecting/combining control signal production device being configured to form and to output a selecting/combining control signal to determine final noise-reduced video data based on said difference cause discriminating signals from said plurality of correlation-utilizing noise reduction devices; and
  a selecting/combining device being configured to obtain said final noise-reduced video data by selecting or combining noise-reduced data from said plurality of correlation-utilizing noise reduction device, based on said selecting/combining control signal.

18. The noise reduction circuit according to claim 17 further comprising,
  a low-pass filter noise reduction device being configured to output low-pass filtered noise-reduced data obtained by removing a high-frequency noise component from said input video data by passing said input video data through a low-pass filter, said selecting/combining control signal production device provides a selecting/combining control signal that selects said low-pass filtered noise-reduced data to said selecting/combining device depending on said selecting/combining control signal when said difference cause discriminating signals from all of said plurality of correlation-utilizing noise reduction devices indicate that said differences occurs due to a valid change of said image.

19. The noise reduction circuit according to claim 18 wherein said video data storage device has a capacity allowing a shift amount in said time direction of said correlation-utilizing noise reduction device that utilizes a correlation between said first pixel and said second pixel, and said video data storage device supplies to each of said plurality of correlation-utilizing noise reduction devices data for a third pixel in a position in said time direction and said space direction that corresponds to said first and second pixels.

20. The noise reduction circuit according to claim 19 wherein said plurality of correlation-utilizing noise reduction devices includes a noise reduction device utilizing inter-frame correlation, a noise reduction device utilizing inter-field correlation, and a noise reduction device utilizing inter-line correlation.

* * * * *